United States Patent [19]

Nakamura

[11] Patent Number: 5,027,248

[45] Date of Patent: Jun. 25, 1991

[54] MAGNETIC RECORDING AND REPRODUCING APPARATUS WITH A TAPE GUIDE

[75] Inventor: Shinya Nakamura, Shizuoka, Japan

[73] Assignee: Tokyo Electric Company, Ltd., Tokyo, Japan

[21] Appl. No.: 326,730

[22] Filed: Mar. 21, 1989

[30] Foreign Application Priority Data

Mar. 24, 1988 [JP] Japan ................................. 63-70363

[51] Int. Cl.⁵ .............................................. G11B 15/60
[52] U.S. Cl. .................................. 360/130.21; 360/83
[58] Field of Search ................ 360/106, 81, 83, 130.2, 360/130.21; 242/197-201; 226/196

[56] References Cited

U.S. PATENT DOCUMENTS

| | | | |
|---|---|---|---|
| 3,645,528 | 2/1972 | Zimmerman | 360/106 |
| 4,427,166 | 1/1984 | Oishi et al. | 226/196 |

Primary Examiner—David J. Severin
Attorney, Agent, or Firm—Oblon, Spivak, McClelland, Maier & Neustadt

[57] ABSTRACT

The present invention performs improvement in travelling characteristics of magnetic tapes and scanning chracterictics of magnetic heads by forming a tape running face which is made to run along a part of a course of a magnetic tape bent by a magnetic head to support the magnetic tape ranging over the full width, an opening which is located in the tape running face and made to run along an area of movement the magnetic head, and guide members for guiding the both edges of the magnetic tape to the both sides of the tape running face.

3 Claims, 4 Drawing Sheets

MAGNETIC RECORDING AND REPRODUCING APPARATUS WITH A TAPE GUIDE

FIELD OF THE INVENTION AND RELATED ART STATEMENT

The present invention relates to a magnetic recording and reproducing apparatus which makes recordings on an endless magnetic tape, for example, such as a recording apparatus of a message phone, a recording apparatus of a learning machine.

Until now, as shown in FIG. 6 and FIG. 7, there has been available a magnetic recording and reproducing apparatus in which a magnetic tape of a narrow width 100 is fed in one direction, and a magnetic head 101 of a width wider than that of the magnetic tape 100 is made to contact with the magnetic tape 100 to record and reproduce pieces of information.

As an apparatus using a magnetic tape of a wide width, though not shown, there is available a magnetic recording and reproducing apparatus in which an endless magnetic tape of a wide width is wound on a pair of rollers including a pinch roller coupled with a motor and a magnetic head is scanned in the widthwise direction of the magnetic tape in the process during which the motor is driven to make the magnetic tape rotate by a fixed number of times, thereby recording and reproducing pieces of information on the magnetic tape.

However, the magnetic tape 100 of a wide width shown in FIG. 6 and FIG. 7 is supported ranging over its total width by the magnetic head 101 of a width wider than that of the magnetic tape 100, and on the other hand, the above-mentioned magnetic tape of a wide width is pushed partially against the magnetic head 101 in its widthwise direction. The magnetic tape is, therefore, bent partially in the widthwise direction, the travel speed of the magnetic tape becomes unstable, and at the same time, the magnetic head itself receives large resistance from the magnetic tape in the scanning direction.

OBJECT AND SUMMARY OF THE INVENTION

A first object of the present invention is to make travelling of a magnetic tape smoothly.

A second object of the present invention is to make scanning of a magnetic head smoothly.

A third object of the present invention is to fix a position of travelling of a magnetic tape in the widthwise direction.

A fourth object of the present invention is not to increase the running resistance of a magnetic tape even if the magnetic tape is made to run while one side of the magnetic tape in the widthwise direction is energized.

The present invention is, in a magnetic recording and reproducing apparatus having an endless magnetic tape of a wide width wound on a pair of rollers including a pinch roller coupled with a motor and a head travelling drive member for driving a magnetic head along the widthwise direction of the magnetic tape, provided with a tape guide having a tape running face for supporting the magnetic tape ranging over its full width along a part of the course of the magnetic tape bent by the magnetic head, an opening located inside the tape running face and provided along a moving locus of the magnetic head, and guide members formed on the both sides of the tape running surface for guiding the both side edges of the magnetic tape.

Also, a plurality of projections which slant gradually toward the guide member on one side as they head toward the direction of progress of the magnetic tape are formed on the tape running face.

Further, ridgeline members which intersect the magnetic tape perpendicularly are protrudingly formed on the guide members.

Accordingly, since the magnetic tape of a wide width is supported ranging over its full width by the tape running face and given a tension, even if the magnetic head contacts with the magnetic tape, the magnetic tape is partially bent in its widthwise direction with a small degree, and a fault due to this deformation is removed.

Also, since the magnetic tape is guided by the projections, the magnetic tape is subjected in its one side edge to positioning by the guide member on one side and travels in a state in which its position in its widthwise direction remains fixed.

Furthermore, since the magnetic tape is supported at its side edges by the ridgeline members in a state of a near point contact, even if the magnetic tape is given a energizing force in its widthwise direction, the running resistance of the magnetic tape is reduced and moreover, the position of the track of the magnetic tape is correctly decided.

DETAILED DESCRIPTION OF PREFERRED EMBODIMENT

Figure 1:
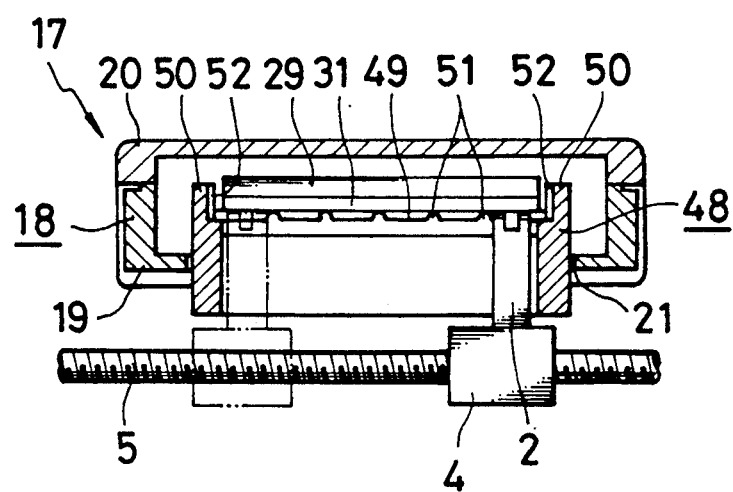
FIG. 1 is a front view of a londitudinal section showing a state in which a cassette tape is fitted in a recording and reproducing machine.
Figure 2:
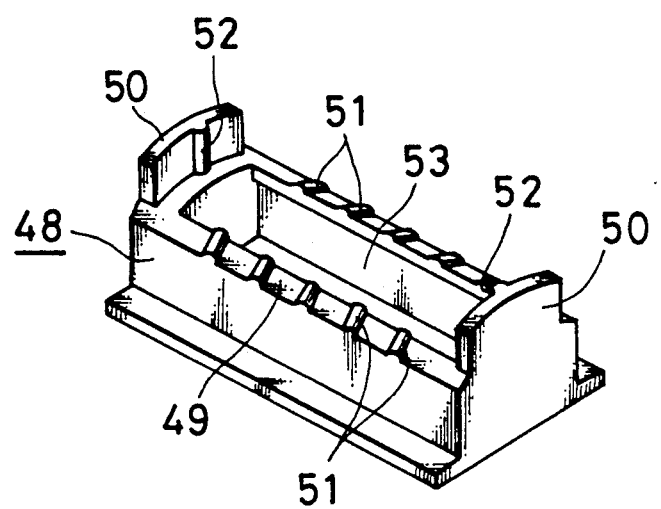
FIG. 2 is a perspective view of a tape guide.
Figure 3:
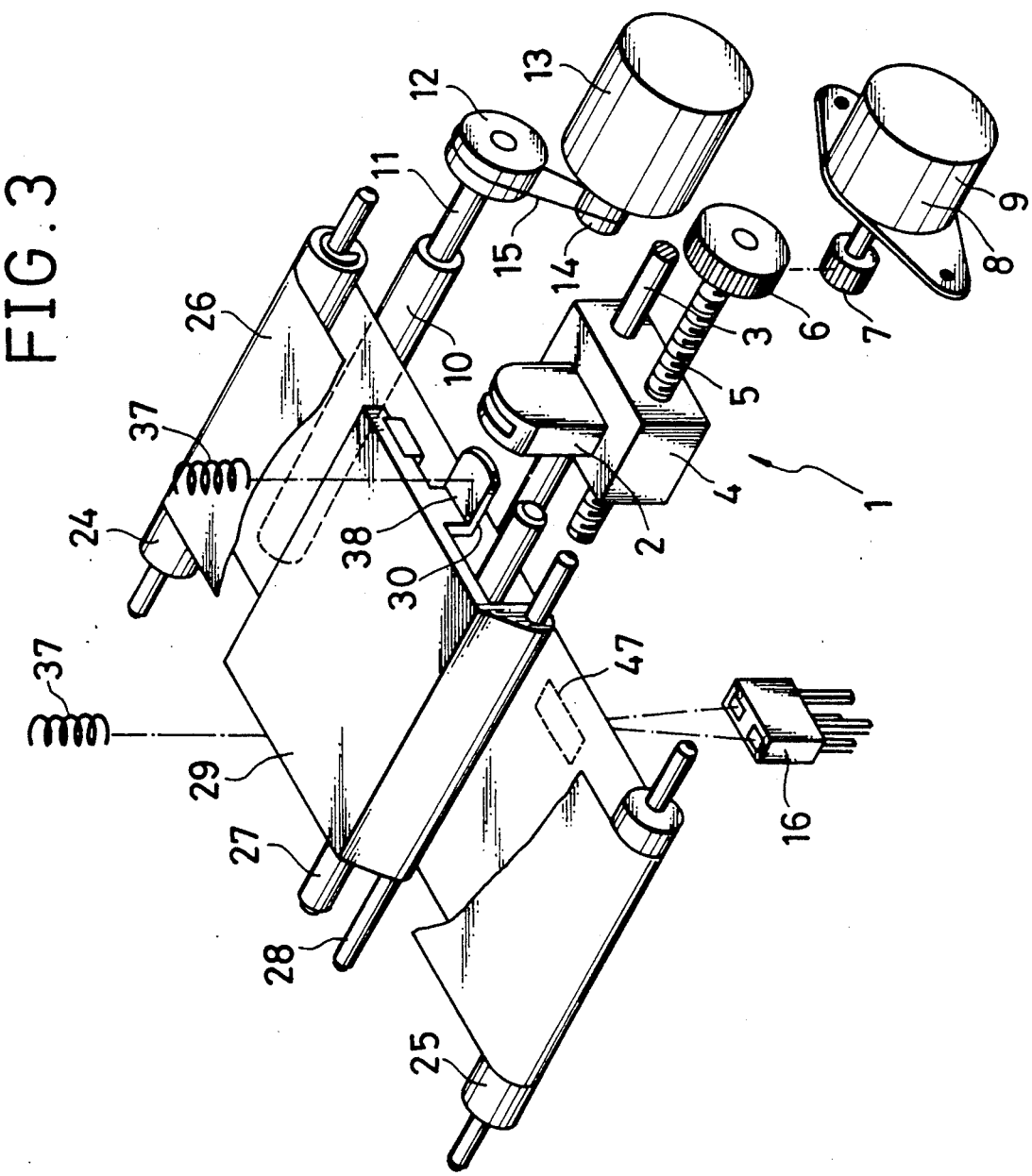
FIG. 3 is a disassembled perspective view showing the relation between a recording and reproducing machine and an internal mechanism of a cassette tape.
Figure 4:
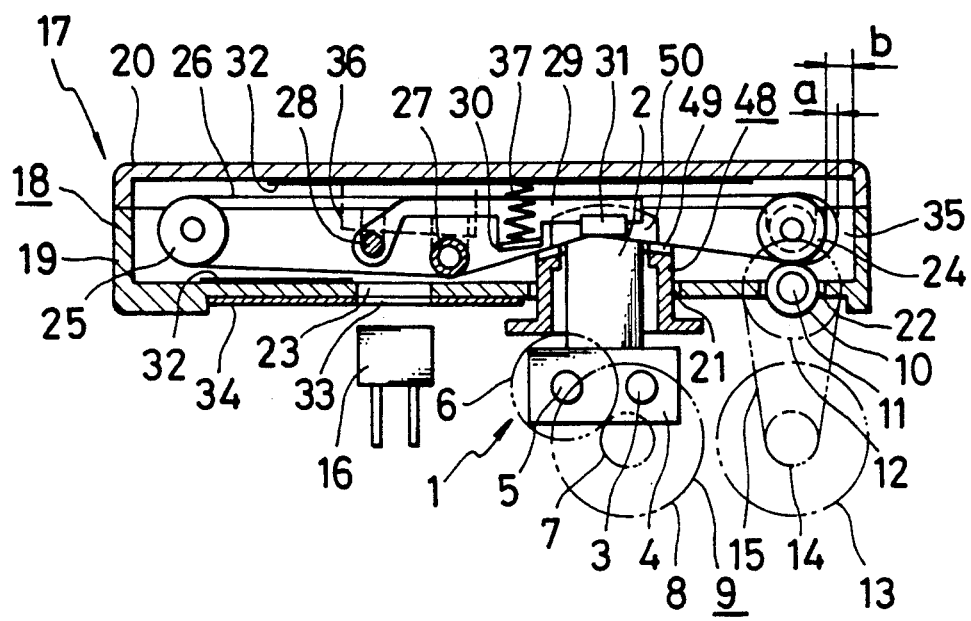
FIG. 4 is a longitudinal side view showing a state in which a cassette tape is fitted in a recording and reproducing machine.

An embodiment according to the present invention will be described based on FIG. 1 to FIG. 5. At first, a construction of a recording and reproducing machine 1 is shown in FIG. 3 and FIG. 4. Reference numeral 2 is a magnetic head, which is held by a carrier 4 slidably fitted into a carrier shaft 3. A head running drive member 9 is composed of a feed screw 5 screwed with the carrier 4 with its movement in its axial direction controlled, a gear 6 fixed to an end portion of the feed screw 5, and a gear 7 directly coupled with a carrier motor 8 and engaged with the gear 6. A capstan 10 is rotatably provided in parallel with the carrier shaft 3. A belt 15 is wound on a pulley 12 coupled with the capstan 10 via a shaft 11 and a pulley 14 directly coupled with a motor 13. Further, a reflection-type photoelectric detector 16 is provided in the recording and reproducing machine 1.

Secondly, a construction of a cassette tape 17 will be described. Reference numeral 18 is a flat cassette case. The cassette case 18 is made by coupling a bottom case 19 with one face open and an upper case 20 both of which are divided cases, while putting the faces of the both openings together, and an opening 21 along an area of movement of the magnetic head 2, an opening 22 for protruding the capstan 10, and an opening 23 opposite to the photoelectric detector 16 are formed in the bottom case 19. Also, in the cassette case 18, a magnetic tape 26 wound on a pinch roller 24 and the other roller 25 is stored, and concurrently, an auxiliary roller 27 formed by a pipe and a pad holder 29 which rotates round a supporting shaft 28 are provided. The pad holder 29 is provided with an oblong pushing face 30 which pushes the magnetic tape 26 against the internal face of the bottom case 19 and an oblong soft pad 31 opposite to the magnetic head 2. Furthermore, a static electricity preventive layer 32 is formed on the internal faces of the bottom case 19 and the upper case 20 by means such as the application of a static electricity preventive sheet and the application of a static electricity preventive agent. Furthermore, the cassette case 18 is provided with a window 33 corresponding to the opening 23. A lid 34 for opening and closing of the openings 21 and 22 is slidably fitted into the window 33. Moreover, a space 35 wider than the looseness of the magnetic tape 26 is formed around the pinch roller 24 in the cassette case 18. In other words, when the whole part of the magnetic tape 26 is made to strain, the load in the rotating system is made high. Accordingly, since a margin in its length is taken into consideration for the magnetic tape 26 so as to form the looseness in one part of the magnetic tape 26, it is desirable to strain the magnetic tape 26 between the roller 25 and the auxiliary roller 27 and between the magnetic head 2 and the pinch roller 24 in a packaging state as shown in FIG. 4. Accordingly, when the pinch roller 24 is driven in the counterclockwise direction, the magnetic tape 26 overruns outside the pinch roller 24 with the looseness a. Accordingly, a space b wider than a is left to form the space 35. Further, a projection piece 36 which pushes the supporting shaft 28 of the pad holder 29 and the auxiliary roller 27 is integrally formed in the upper case 20, and the both sides of the pad holder 29 is energized toward the side of the bottom case 19 by a spring 37.

Figure 5:
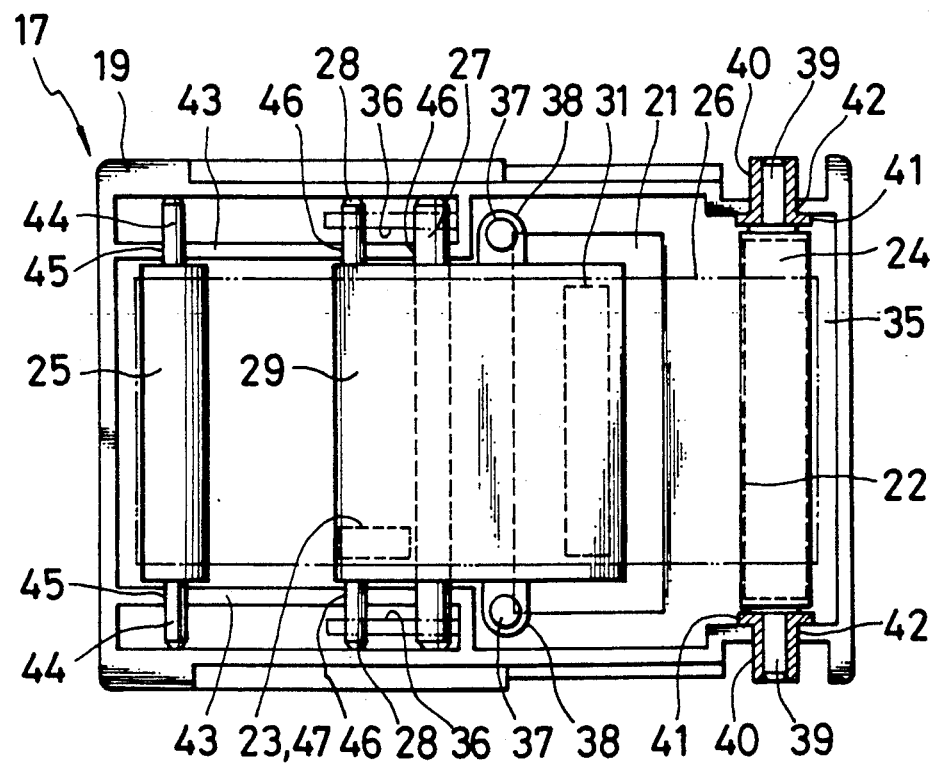
FIG. 5 is a plan view showing an internal construction of a cassette case except a divided case on one side.
Figure 6:
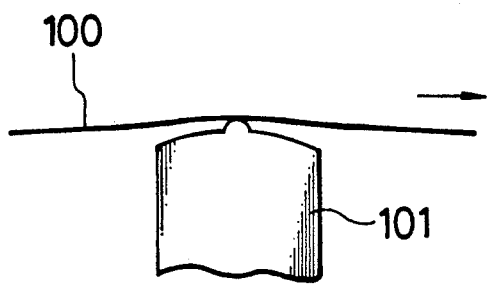
FIG. 6 is a side view showing a contacting state between a magnetic tape and a magnetic head.
Figure 7:
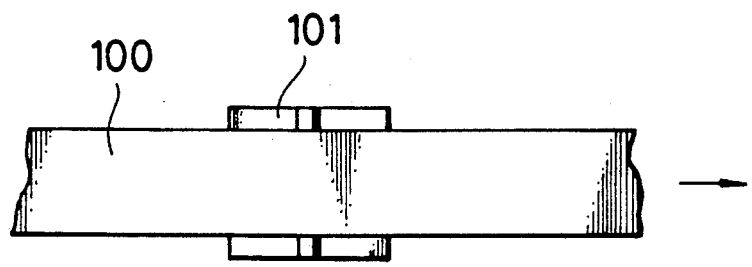
FIG. 7 is a plan view of FIG. 6.

FIG. 5 is a plan view showing the inside of the cassette tape 17 with the upper case removed. In FIG. 5, projection pieces 38 are protrudingly formed on the both sides of a pushed face 30 of the pad holder 29, and the spring 37 is compressed between these projection pieces 38 and the internal face of the upper case 20. Flanges 41 which strike against the internal faces of the bottom case 19 and the upper case 20 are formed integrally with bearings 40 which rotatably support a shaft member 39 at the both ends of the pinch rollers 24. Accordingly, the movement of these bearings 40 in the axial direction are controlled by striking of the internal face of the cassette case 18 against the flange 41, and at the same time, these bearings 40 are fitted into U-shaped grooves 42 formed in the bottom case 19 and held in a state in which the lifting thereof from the grooves 42 is prevented by the upper case 20. Also, in ribs 43 on the right and left sides formed in the bottom case 19, a U-shaped groove 45 for rotatably holding a shaft member 44 protruding from the both ends of the roller 25 and a U-shaped groove 46 for rotatably holding the both end members of the auxiliary roller 27 and the supporting shaft 28 of the pad holder 29 are formed. The lifting of the auxiliary roller 27 and the supporting shaft 28 from the grooves 45 and 46 is prevented by the upper case 20. Moreover, as is obvious from FIG. 5, the pinch roller 24 and the capstan 10 are set to such lengths as to protrude in each axial direction from the both ends of the magnetic tape 26, and a turning effort is transmitted to the above-mentioned both at a contacting portion which the above-mentioned both contact with the magnetic tape 26 at its both outsides. Further, a face to be detected 47 having a higher reflection factor than that at the other portion is formed in a portion of the outer surface of the magnetic tape 26 by applying means such as a reflection tape thereto.

A tape guide 48 is fixedly provided in the recording and reproducing machine 1. As shown in FIG. 1, FIG. 2, and FIG. 4, the tape guide 48 has a tape running face 49 which supports the magnetic tape 26 ranging over its full width along a part of the course of the magnetic tape 24 bent between the auxiliary roller 27 and the pinch roller 26 by the magnetic head 2, an opening 53 located at the tape running face 49 and formed along an area of movement of the magnetic head 2, and one pair of guide members 50 in right and left which are formed on the both sides of the tape running face 49 to guide both side edges of the magnetic tape 26. A plurality of ridges 51 which gradually slant to the side of the left guide member 50 as the magnetic tape 26 advances toward the direction of progress thereof are formed on the tape running face 49, and ridgeline members 52 which intersect the side edge of the magnetic tape 26 perpendicularly are formed.

With this configuration, when the cassette tape is not used, the openings 21 and 22 are blocked by sliding the lid 34. When the cassette tape remains in a state in which it is not fitted in the recording and reproducing machine, the magnetic tape 26 is fixed by the pushed face 30 because the pad holder 29 is rotated by a force of the spring 37. By this, it happens by no means that the magnetic tape 26 moves and is rubbed by the inner face of the cassette case 18 to flaw it.

In recording or reproducing, the lid 34 is slid to open the openings 21 and 22 and the window 33 of the lid 34 is made to coincide with the opening 23 opposite to the photoelectric detector 16. When the cassette tape 17 is fitted in the recording and reproducing machine 1 in this open state, the pinch roller 24 is pushed by the capstan 10. The magnetic tape 26 is supported by ridges 51 of the tape guide 48 which protrude from the opening 21 toward the inside of the cassette case 18, given a tension between the auxiliary roller 27 and the pinch roller 24, and at the same time, pushed against the magnetic head 2 which protrudes from an opening 53, and supported by the pad 31. The rotation of the capstan 10 is transmitted to the pinch roller 24 through a force of friction by driving the motor 13. On the other hand, the feed screw 5 is rotated in either angular direction by the carrier motor 8, by which the carrier 4 moves in the width direction of the magnetic tape 26 together with the magnetic head 2, and in that process, recording and reproducing of pieces of information are performed. In this way, since, turning the magnetic tape 26, the photoelectric detector 16 detects the face to be detected 47 for each rotation, the rotary motion of the carrier motor 8 is controlled by the detected signal, thereby allowing the tracking operation of the magnetic head 2 to be corrected.

In addition, when the recording capacity becomes saturated, and moreover, pieces of information need to be recorded, another cassette tape 17 is fitted in place of the cassette tape 17 in the recording and reproducing machine 1. By this, one recording and reproducing machine 1 allows a greater amount of information to be dealt with and its use to be enlarged.

Though the recording and reproducing are carried out as described previously, since the magnetic tape 26 of a wide width is supported by the ridges 51 on the tape running face 49 ranging over its full width to be applied with a tension, the magnetic tape 26 is bent in its widthwise direction by no means. By this, the travelling speed of the magnetic tape 26 is stabilized, and the resistance which the magnetic head 2 receives from the magnetic tape 26 when it moves in the scanning direction can be reduced, allowing the magnetic head 2 to be smoothly moved. Further, the magnetic tape 26 is guided by the ridges 51 and one side edge thereof can be positioned at one side of the guide members 50. Furthermore, the side edge of the magnetic tape 26 is supported in a near point-contacted state by the ridgeline members 52, by which the running resistance of the magnetic tape 26 is reduced and moreover, the track position of the magnetic tape 26 is accurately decided on the basis of the ridgeline members 52 even when the magnetic tape 26 moves obliquely.

Incidentally, though the ridgeline members 52 are formed in such a shape as fish-paste like projections are formed in one body at the center of the guide members 50, the ridgeline members 52 may be formed by bending the internal faces of the guide members 50 in an angle-like shape.

Since the present invention is configurated as described previously, the magnetic tape of a wide width can be given tension ranging over the full width by the tape running face of the tape guide, by which it can be prevented from bending in its widthwise direction. By this, the travelling speed of the magnetic tape is stabilized, and at the same time, the resistance applied to the magnetic head from the magnetic tape can be reduced when the magnetic head moves in the scanning direction, by which the magnetic tape can be moved smoothly. Further, by forming ridges slanted in one direction on the tape running face, the magnetic tape is guided by the ridges, and one side edge of the magnetic tape can be subjected to positioning by the guide member on one side. Furthermore, by forming ridgeline members in guide members, the side edges of the magnetic tape can be supported by the ridgeline members in a near point contact state, by which the running resistance of the magnetic tape can be reduced, and moreover the track position of the magnetic tape can be accurately decided on the basis of the ridgeline members even when the magnetic tape moves obliquely.

What is claimed is:

1. A magnetic recording and reproducing apparatus comprising:
    an endless magnetic tape having a wide width, said endless magnetic tape being wound by a pair of rollers including a pinch roller coupled with a motor;
    a head running drive member which drives a magnetic head along an area of movement in a widthwise direction of the magnetic tape;
    a tape guide having a tape running face which is made to run along one part of a course of said magnetic tape bent by said magnetic head to support the magnetic tape ranging over the full width;
    an opening located on the tape running face and made to run along said area of movement of said magnetic head; and
    guide members formed at both sides of the tape running face to guide both side edges of said magnetic tape.

2. A magnetic recording and reproducing apparatus according to claim 1 wherein a plurality of ridges which gradually slant toward the guide member on one side as the magnetic tape heads to its direction of progress are formed on the tape running face.

3. A magnetic recording and reproducing apparatus according to claim 1 wherein ridgeline members which intersect the magnetic tape perpendicularly are protrudingly formed on the guide members.

* * * * *